United States Patent
Nuti

[19]
[11] Patent Number: 5,462,024
[45] Date of Patent: Oct. 31, 1995

[54] AUXILIARY CARBURETION DEVICE IN DIRECT FUEL INJECTION ENGINES

[75] Inventor: Marco Nuti, Pisa, Italy

[73] Assignee: Piaggio Veicoli Europei S.p.A., Italy

[21] Appl. No.: 169,219

[22] Filed: Dec. 20, 1993

[30] Foreign Application Priority Data

Dec. 23, 1992 [IT] Italy .................. MI92A2945

[51] Int. Cl.[6] .................. F02M 1/04; F02M 71/04; F02M 17/04
[52] U.S. Cl. .................. 123/179.14; 123/73 A; 123/437; 261/39.5
[58] Field of Search .................. 123/179.7, 179.14, 123/179.18, 437, 431; 261/39.5, 121.4, DIG. 68, DIG. 8

[56] References Cited

U.S. PATENT DOCUMENTS 4,172,864 10/1979 Hohsho et al. .................. 261/39.5
4,216,175 8/1980 Schauer .................. 123/179.18 X
5,241,931 9/1993 Radel .................. 123/179.14

FOREIGN PATENT DOCUMENTS 0287366 4/1988 European Pat. Off. .
410355 7/1990 European Pat. Off. .
2303162 10/1976 France .................. 123/437
607692 6/1945 United Kingdom .

Primary Examiner—Tony M. Argenbright
Attorney, Agent, or Firm—Diller, Ramik & Wight

[57] ABSTRACT

An auxiliary carburetion device in direct fuel injection engines, to be positioned in correspondence with a main duct (12) feeding air to the engine crankcase (10), a throttling member (38) being located in the main duct (12). The device includes a block (13) containing at least one selective regulating element (15, 25) positioned in a connection duct (19, 20; 30) which is connected at one end to a vessel (14; 45, 51) containing a constant predeterminable amount of fuel and to a mixing air duct (23, 32), and at the other end to the main duct (12) feeding the crankcase (10).

16 Claims, 3 Drawing Sheets

5,462,024

AUXILIARY CARBURETION DEVICE IN DIRECT FUEL INJECTION ENGINES

BACKGROUND OF THE INVENTION

This invention relates to an auxiliary carburetion device in direct fuel injection engines.

In two-stroke engines, various arrangements or relative devices are known in which the fuel is fed directly into the cylinder, whereas only air is drawn into the main crankcase. In these known devices, on starting the engine under cold conditions at low rotational speed, below the engine self-sustaining speed, a considerable fuel quantity is required. The injection system encounters difficulty in supplying this considerable fuel quantity. The difficulties generally arise for the following reasons:

- when the engine is cold, considerable condensation takes place on the inner walls of the cylinder;
- the low rotational speed results in low turbulence and more difficult mixing;
- the formation of intermediate combustion products is hindered because of the low available time and low temperature, leading to direct injection difficulties.

SUMMARY OF THE INVENTION

The object of the present invention is to obviate the aforesaid drawbacks, particularly in two-stroke engines.

This object is attained according to the present invention by an auxiliary carburetion device in direct fuel injection engines, to be positioned in correspondence with a main duct feeding air to the engine crankcase, a throttling member being located in said main duct, characterised by comprising a block containing at least one selective regulating element positioned in a connection duct which is connected at one end to a vessel containing a constant predeterminable amount of fuel and to a mixing air duct, and at the other end to said main duct feeding the crankcase.

The characteristics and advantages of an auxiliary carburetion device according to the present invention will be more apparent from the following detailed description given by way of nonlimiting example with reference to the accompanying schematic drawings, in which:

DESCRIPTION OF THE PREFERRED EMBODIMENTS

Figure 1:
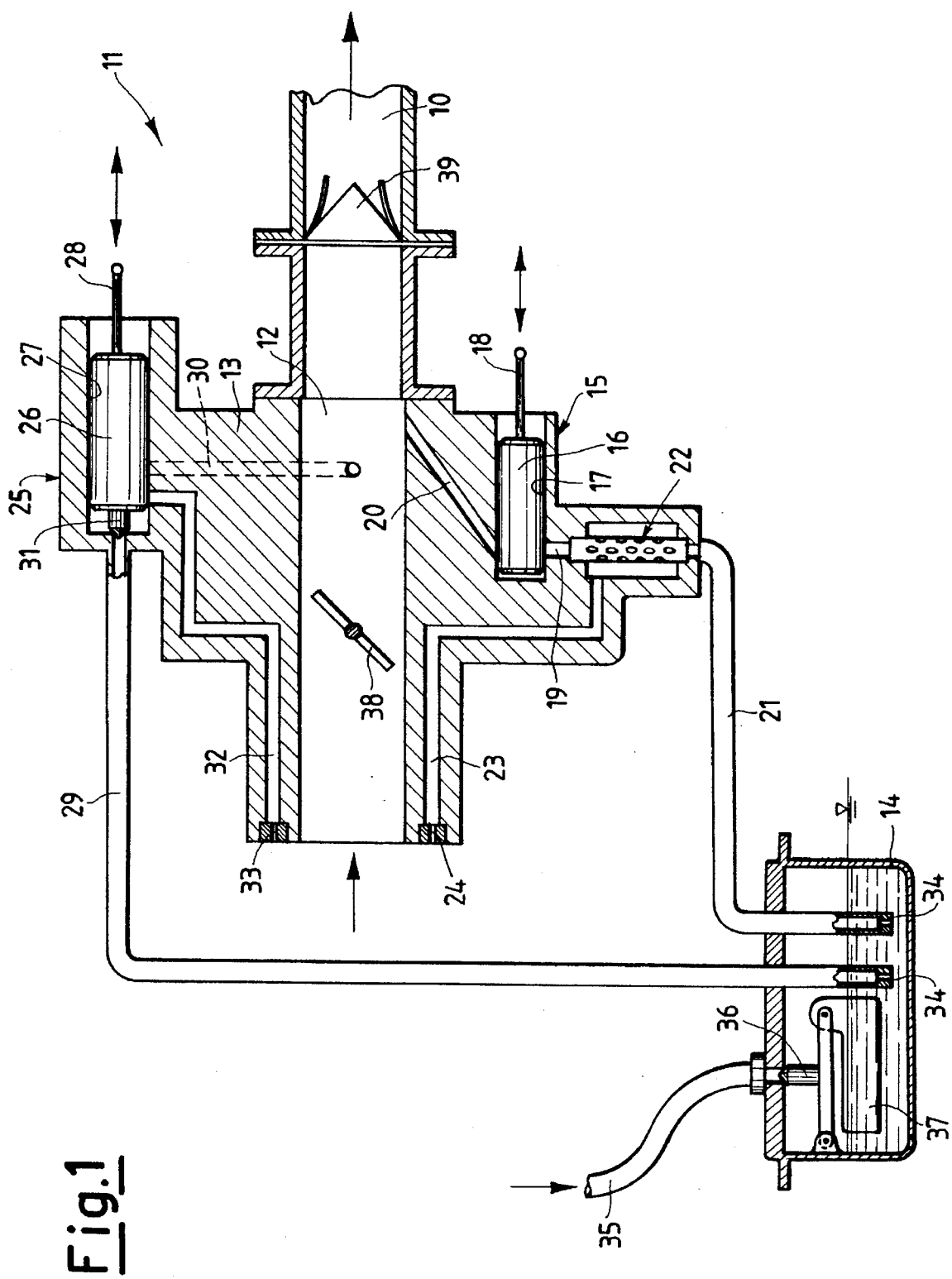
FIG. 1 is a cross-section through the device of the present invention.

FIG. 1 shows an auxiliary carburetion device 11 according to the invention for installation in direct fuel injection engines, to be fitted either to the engine cylinder head (not shown) or to a main duct 12 feeding air to the engine crankcase, partly shown at 10. The device comprises a block 13 containing regulating elements, and a fuel vessel 14, which can either be connected to the block 13 or form an integral part of it.

In the illustrated embodiment the block 13 comprises a first regulating element 15, consisting for example of a piston 16 positioned in a relative seat 17 and operable by a rod 18. The rod 18 can either be connected to an electrical, pneumatic or thermal drive, or be manually operated from the outside, depending on the particular requirements.

The piston 16 selectively interrupts or connects together two successive portions 19 and 20 of a connection duct which open on opposite sides of the seat 17. The portion 19 is connected to a fuel pipe 21 extending from the vessel 14, and the portion 20 is connected to the main duct 12 feeding the crankcase 10.

Interposed between the pipe 21 and the duct portion 19 there is a mixing unit 22 connected to an air intake duct 23. The duct 23 feeds a predetermined mixing air volume to said mixing unit 22 via a sized nozzle In the illustrated embodiment there is also a second regulating element 25, consisting for example of a piston 26 arranged in a relative seat 27 and operable by a rod 28. Again, the rod 28 can either be connected to an electrical, pneumatic or thermal drive, or be manually operated from the outside, depending on the particular requirements.

The piston 26 contained in the seat 27 selectively interrupts or connects together a fuel pipe 29 and a connection duct 30 which open into opposite sides of the seat 27. The fuel pipe 29 is connected to the vessel 14 via a conical seal 31 and the connection duct 30 is connected to the main duct 12 feeding the engine crankcase 10. Into the seat 27 close to where the pipe 29 is connected, there opens an air intake duct 32 having at its other end a sized nozzle 33.

The fuel pipes 21 and 29 are inserted into the vessel 14 and carry at their ends sized nozzles 34 through which the fuel flows at a regulated rate.

The fuel is fed into the vessel 14, of the constant level type, via a pipe 35, at the end of which there is a valving element 36, for example in the form of a needle valve, controlled by a float 37 which adjusts the fuel flow to maintain a constant level within the vessel 14.

Within the main feed duct 12 there is provided for example a throttle or regulating member 38 such as a butterfly valve, to selectively open the duct 12 to an extent depending on the output power to be generated. At that end of the main duct 12 facing the engine crankcase 10 there is provided a flap valve indicated schematically at 39, which opens in accordance with the vacuum generated in said crankcase 10, and in combination with the positioning of the throttle member enables a variable air quantity to be drawn into and compressed within the crankcase.

The inclusion of at least one of said regulating elements 15 and/or 25 in the auxiliary carburetion device of the present invention hence enables the feed to be effected for a determined time sufficient to overcome the initially stated problems of controlled-ignition two-stroke engines with direct fuel injection.

Figure 2:
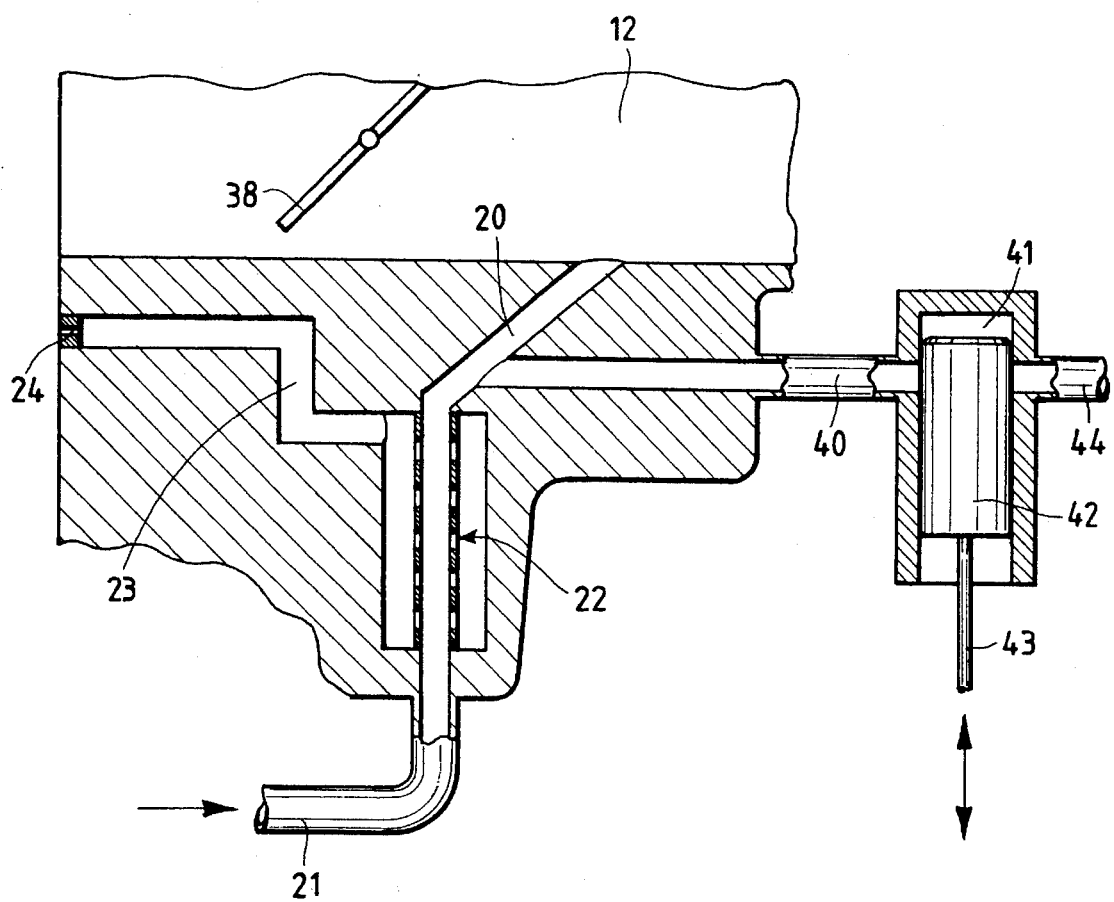
FIG. 2 is a detail of a further embodiment of the device of FIG. 1.

FIG. 2 shows an alternative embodiment of the auxiliary carburetion device of the present invention, in which equal elements carry the same reference numerals.

In this embodiment, instead of intercepting the connection duct towards the main duct by means of the piston, the regulating element is used to connect that connection duct portion 20 connected to the main duct 12 directly to atmosphere so that fuel is no longer drawn in.

Figure 3:
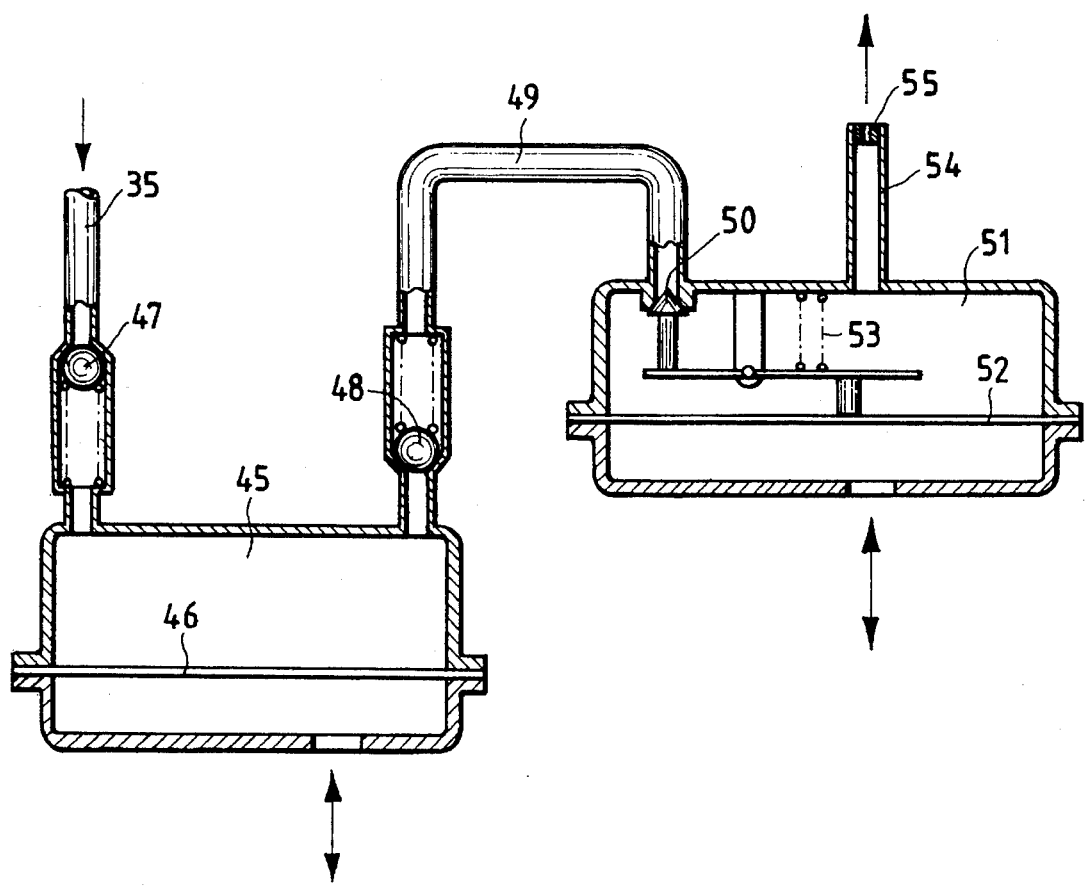
FIG. 3 is a detail of yet a further embodiment of the device of FIG. 1.

In this respect, into that portion 20 of the connection duct provided between the fuel pipe 21 and the main duct 12 there opens a further duct 40 connected to a cylinder 41 acting as a seat for a piston 42. The piston 42, operable by means of a rod enables the further duct 40 to be connected to an exit duct 44, ie directly to atmosphere to interrupt the flow of fuel mixture to the main duct 12 because of the fall in pressure. This is because on connecting the main duct 12 to atmosphere downstream of the mixing unit 22, the pressure falls so preventing fuel intake. FIG. 3 shows in detail a modified embodiment of the vessel to be associated with an auxiliary carburetion device of the present invention.

In this embodiment, instead of the vessel 14 of traditional constant level type, analogous devices provided for example with a membrane are used.

Specifically, the fuel feed pipe 35 is connected to a first chamber 45, one wall 46 of which consists of a membrane on which atmospheric pressure acts. At the end of the first chamber there are valves 47 and 48, for example of the one-way single direction type, which selectively connect the pipe 35 to a downstream pipe 49.

The other end of the pipe 49 is closed by a valving element 50 which is contained in a second chamber 51, one wall 52 of which also consists of a membrane on which atmospheric pressure acts. In the example, the valving element 50 consists of a needle valve maintained in position within the end of the pipe 49 by the combined action of the second wall or membrane 52 and a spring 53 which opposes atmospheric pressure.

A further pipe piece 54 connects the chamber 51 to the fuel feed pipe, for example 21, by way of a sized nozzle 55.

Although a preferred embodiment of the invention has been specifically illustrated and described herein, it is to be understood that minor variations may be made in the apparatus without departing from the spirit and scope of the invention, as defined the appended claims.

I claim:

1. An auxiliary carburetion device for utilization with direct fuel injection engines which include a main duct (12) for feeding air to an engine crankcase (10) under the control of a throttling member (38) in the main duct (12) comprising first (15, 42, 50) and second (25) regulating valve means associate with respective first (19, 20, 21; 20, 21, 40, 44; 19, 20, 21, 49, 54) and second (29, 30) duct means for controlling the flow of fluid therethrough, a vessel (14; 45, 51) containing a constant predeterminable amount of fuel, said first duct means being disposed in fluid communication between said vessel and said main duct, said second duct means being disposed in fluid communication between said vessel and said main duct, said first and second regulating valve means includes respective first (16) and second (26) piston means for imparting exterior control to said respective first and second regulating valve means, air duct means (32) in fluid communication with said second duct means, and fluid flow through said air duct means being controlled by said second regulating valve means.

2. The auxiliary carburetor device as defined in claim 1 including further air duct means (23) in fluid communication with said first duct means, and fluid flow through said further duct means being controlled by said second regulating valve means.

3. The auxiliary carburetor device as defined in claim 1 including further air duct means (23) in fluid communication with said first duct means, fluid flow through said further duct means being controlled by said second regulating valve means, and air/fuel mixing means (22) in said first duct means for admixing air of said further duct means with fuel of said first duct means.

4. The auxiliary carburetor device as defined in claim 1 wherein said second duct means (19, 20, 21) is placed in fluid communication with said first regulating valve means (42) by a duct (40) between said second duct means and said first regulating valve means.

5. The auxiliary carburetor device as defined in claim 1 wherein said first regulating valve means (50) is a pressure responsive valve.

6. The auxiliary carburetor device as defined in claim 1 wherein said first regulating valve means (50) is a pressure responsive valve operated by a pressure responsive diaphragm (52).

7. The auxiliary carburetor device as defined in claim 1 wherein said first regulating valve means (50) is a pressure responsive valve operated by a pressure responsive diaphragm (52) in fluid communication with said first duct means (21, 54).

8. The auxiliary carburetor device as defined in claim 1 including further air duct means (23) in fluid communication with said first duct means, and fluid flow through said further duct means and said first duct means being controlled substantially simultaneously by said second regulating valve means.

9. The auxiliary carburetor device as defined in claim 2 wherein said second duct means (19, 20, 21) is placed in fluid communication with said first regulating valve means (42) by a duct (40) between said second duct means and said first regulating valve means.

10. The auxiliary carburetor device as defined in claim 4 including air/fuel mixing means (22) in said first duct means downstream of said last-mentioned duct (40) for admixing air of said further duct means with fuel of said first duct means.

11. An auxiliary carburetion device for utilization with direct fuel injection engines which include a main duct (12) for feeding air to an engine crankcase (10) under the control of a throttling member (38) in the main duct (12) comprising first (15, 42, 50) and second (25) regulating valve means associated with respective first (19, 20, 21; 20, 21, 40, 44; 19, 20, 21, 49, 54) and second (29, 30) duct means for controlling the flow of fluid therethrough, a vessel (14; 45, 51) containing a constant predeterminable amount of fuel, said first duct means being disposed in fluid communication between said vessel and said main duct, and said second duct means disposed in fluid communication between said vessel and said main duct, and said second duct means (19, 20, 21) is placed in fluid communication with said first regulating valve means (42) by a duct (40) between said second duct means and said first regulating valve means.

12. The auxiliary carburetion device as defined in claim 11 including air/fuel mixing means (22) in said first duct means downstream of said last-mentioned duct (40) for admixing air of said further duct means with fuel of said first duct means.

13. The auxiliary carburetor device as defined in claim 11 including further air duct means (23) in fluid communication with said first duct means, and fluid flow through said further duct means being controlled by said second regulating valve means.

14. The auxiliary carburetor device as defined in claim 12 including further air duct means (23) in fluid communication with said first duct means, and fluid flow through said further duct means being controlled by said second regulating valve means.

15. The auxiliary carburetor device as defined in claim 12 wherein said first regulating valve means (50) is a pressure responsive valve.

16. The auxiliary carburetor device as defined in claim 12 including further air duct means (23) in fluid communication with said first duct means, and fluid flow through said further duct means and said first duct means being controlled substantially simultaneously by said second regulating valve means.

* * * * *